United States Patent [19]
Li

[11] Patent Number: 5,937,966
[45] Date of Patent: Aug. 17, 1999

[54] POWER STEERING SYSTEM FOR CONSTRUCTION EQUIPMENT

[75] Inventor: Anatoli D. Li, Changwon, Rep. of Korea

[73] Assignee: Volvo Construction Equipment Korea Co., Ltd., Rep. of Korea

[21] Appl. No.: 08/909,329

[22] Filed: Aug. 11, 1997

[30] Foreign Application Priority Data

Oct. 30, 1996 [KR] Rep. of Korea ................. P96-50403

[51] Int. Cl.$^6$ ........................................ B62D 5/06
[52] U.S. Cl. ........................................ 180/432
[58] Field of Search ................. 180/132, 133, 180/141–143, 432; 91/6, 21, 31, 28; 60/384–385

[56] References Cited

U.S. PATENT DOCUMENTS 4,356,759  11/1982  Ljubimov ........................ 91/31
4,566,272  1/1986  Petersen ........................ 60/384
5,263,321  11/1993  Thomsen ........................ 60/384

*Primary Examiner*—Robert J. Oberleitner
*Assistant Examiner*—C. T. Bartz
*Attorney, Agent, or Firm*—Harness, Dickey & Pierce, P.L.C.

[57] ABSTRACT

A power steering system for construction equipment is disclosed. In the steering system, a plurality of internal passages are selectively formed in the directional control valve for left and right steering cylinders. The internal passages thus selectively allow pressurized oil to be fed from an oil pump into both the large chamber of the right cylinder and the small chamber of the left cylinder with a reversible motor starting by pressurized oil discharged from the other chambers of the two cylinders in the event of rotating the steering wheel to the left. The internal passages also allow the pressurized oil to be fed into both the small chamber of the right cylinder and the large chamber of the left cylinder so that the motor is started by pressurized oil discharged from the other chambers of the two cylinders when the steering wheel rotates to the right.

1 Claim, 2 Drawing Sheets

POWER STEERING SYSTEM FOR CONSTRUCTION EQUIPMENT

BACKGROUND OF THE INVENTION

1. Field of the Invention

The present invention relates, in general, to a power steering system for construction equipment and, more particularly, to a simple steering system capable of precisely controlling the position of left and right steering cylinders, thus quickly steering construction equipment with high precision.

2. Description of the Prior Art

The applicant of this invention discloses "a power steering system for construction equipment" in Korean Patent Application No. 96-29,391 (applied on Jul. 19, 1996).

FIG. 1 is a circuit diagram showing the construction of the above power steering system, which is preferably used with a power loader. FIG. 2 is a sectional view of a directional control valve of the steering system of FIG. 1.

In order to steer the loader to the right, a steering wheel (not shown) is rotated by an operator to the right. When the steering wheel is rotated to the right as described above, a steering column 4 is rotated in the same direction. Therefore, a nut sleeve 8, which gears into the steering column 4, is rotated, thus moving the spool 3 of a directional control valve 2 to the left in FIG. 2 within a stroke, thus bringing the valve 2 into a first position (I). When the directional control valve 2 is in the first position (I), the pump line PL is connected to the first cylinder line CL1 through the internal passage I1 of the valve 2, thus feeding pressurized oil from an oil pump into both the small chamber of a right steering cylinder 1a and the large chamber of a left steering cylinder 1b. On the other hand, pressurized oil is discharged from both the small chamber of the left steering cylinder 1b and the large chamber of the right steering cylinder 1a and passes through in the order of the second cylinder line CL2, the internal passage I2 of the valve 2 and a line ML1 prior to being introduced into a reversible motor 5. The pressurized oil, thus rotates the motor 5 in a direction. The rotating force of the above motor 5 is transmitted to the spool 3 through a spline sleeve 11, thereby rotating the spool 3. The spool 3, which engages with the nut sleeve 8, thus precisely returns to the right in FIG. 2 within the stroke, thus bringing the directional control valve 2 into a neutral position (N). Thereafter, the pressurized oil from the reversible motor 5 is fed into the control valve 2 through a line ML2 prior to being returned to an oil tank T through a tank line TL2. It is thus possible to steer the power loader to the right as desired.

Meanwhile, in order to steer the loader to the left, the steering wheel is manually rotated to the left. When the steering wheel is rotated to the left, the steering column 4 is rotated in the same direction. Therefore, the nut sleeve 8 moves the spool 3 of the valve 2 to the right in FIG. 2, thus bringing the valve 2 into a second position (II). When the directional control valve 2 is in the second position (II), the pump line PL is connected to the second cylinder line CL2 through the internal passage II1 of the valve 2, thus feeding pressurized oil into both the large chamber of the right steering cylinder 1a and the small chamber of the left steering cylinder 1b. In this case, pressurized oil is discharged from both the large chamber of the left steering cylinder 1b and the small chamber of the right steering cylinder 1a and passes through in the order of the first cylinder line CL1, the internal passage II2 of the valve 2 and the line ML2 prior to being introduced into the reversible motor 5. The pressurized oil thus rotates the motor 5 in the opposite direction. The rotating force of the above motor 5 is transmitted to the spool 3 through the spline sleeve 11, thus rotating the spool 3. The spool 3 in the above state precisely returns to the left in FIG. 2 within the stroke, thus bringing the directional control valve 2 into the neutral position (N). The pressurized oil from the reversible motor 5 is fed into the control valve 2 through the line ML1 and passes through the internal passage II3 of the valve prior to being returned to the oil tank T through a tank line TL1. It is thus possible to steer the power loader to the left as desired.

However, the above steering system is problematic in that when it is necessary to change the steering direction of the loader from the right or left to the left or right, the spool of the direction control valve, which is in the first or second position, has to be returned to the neutral position, with the steering wheel being stopped, prior to steering the loader to a desirable direction. Therefore, the steering system is time consuming and requires a provision of a complex hydraulic circuit.

SUMMARY OF THE INVENTION

Accordingly, the present invention has been made keeping in mind the above problems occurring in the prior art, and an object of the present invention is to provide a power steering system for construction equipment, which has a simple construction and quickly steers construction equipment with a high steering response, and improves the operational precision while controlling the position of left and right steering cylinders.

In order to accomplish the above object, the present invention provides a steering system for construction equipment, comprising left and right steering cylinders, an oil pump for discharging pressurized oil for the two cylinders, a directional control valve provided with a movable spool for controlling the pressurized oil for the two cylinders, a power transmission unit for transmitting the rotating force of a steering column to the spool of the valve while converting the rotating motion of the column into a linear movement of the spool, and a reversible motor interconnected between the two cylinders and the directional control valve also being provided with a spline shaft being connected to an internal spline part of the spool, wherein a plurality of internal passages are selectively formed in the directional control valve, thus selectively allowing pressurized oil to be fed from the pump into both the large chamber of the right steering cylinder and the small chamber of the left steering cylinder with the reversible motor being started by pressurized oil discharged from both the small chamber of the right steering cylinder and the large chamber of the left steering chamber in the event of rotating the steering column to the left or allowing the pressurized oil to be fed from the pump into both the small chamber of the right steering cylinder and the large chamber of the left steering cylinder with the reversible motor being started by pressurized oil discharged from both the large chamber of the right steering cylinder and the small chamber of the left steering chamber in the event of rotating the steering column to the right.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
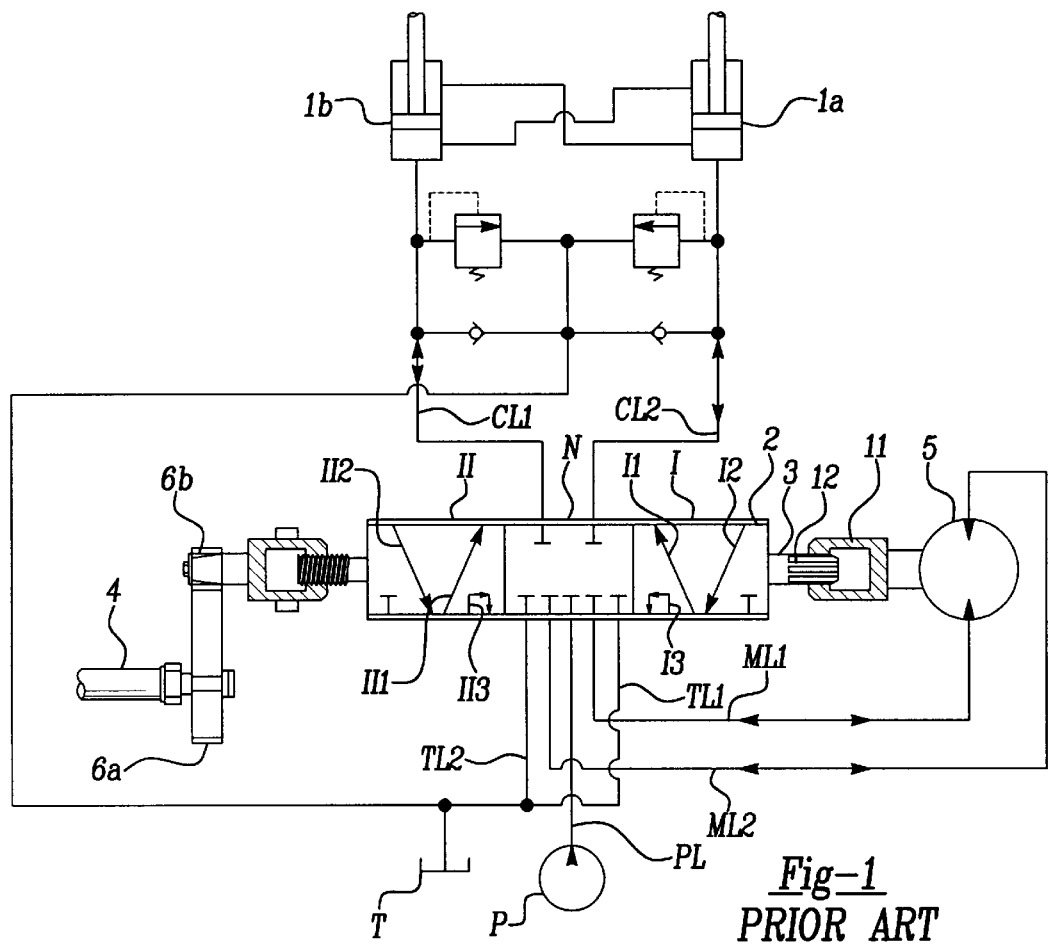
FIG. 1 is a circuit diagram showing the construction of a typical power steering system for construction equipment.
Figure 2:
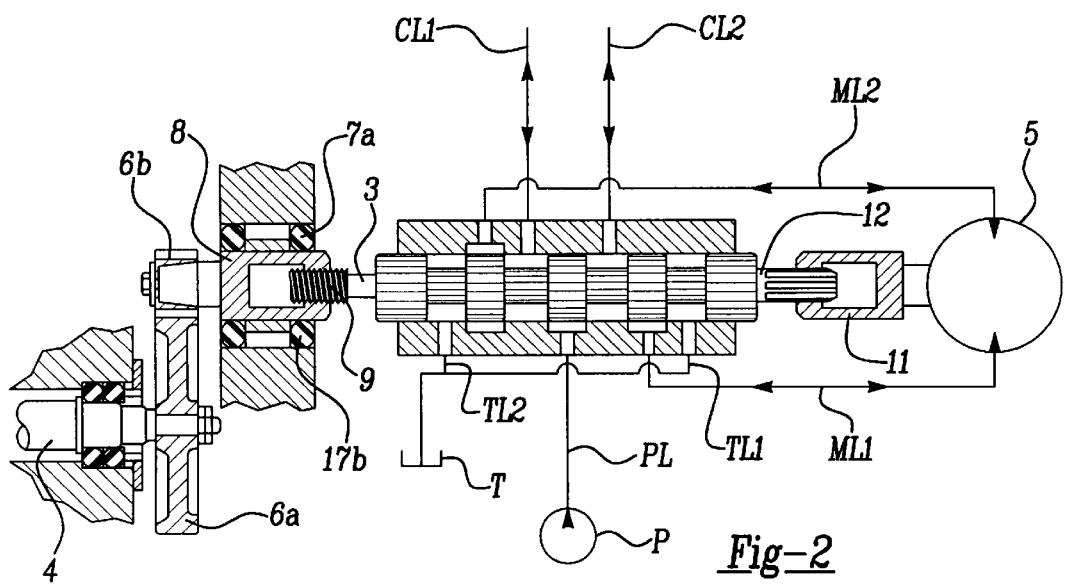
FIG. 2 is a sectional view of a directional control valve used in the steering system of FIG. 1.
Figure 3:
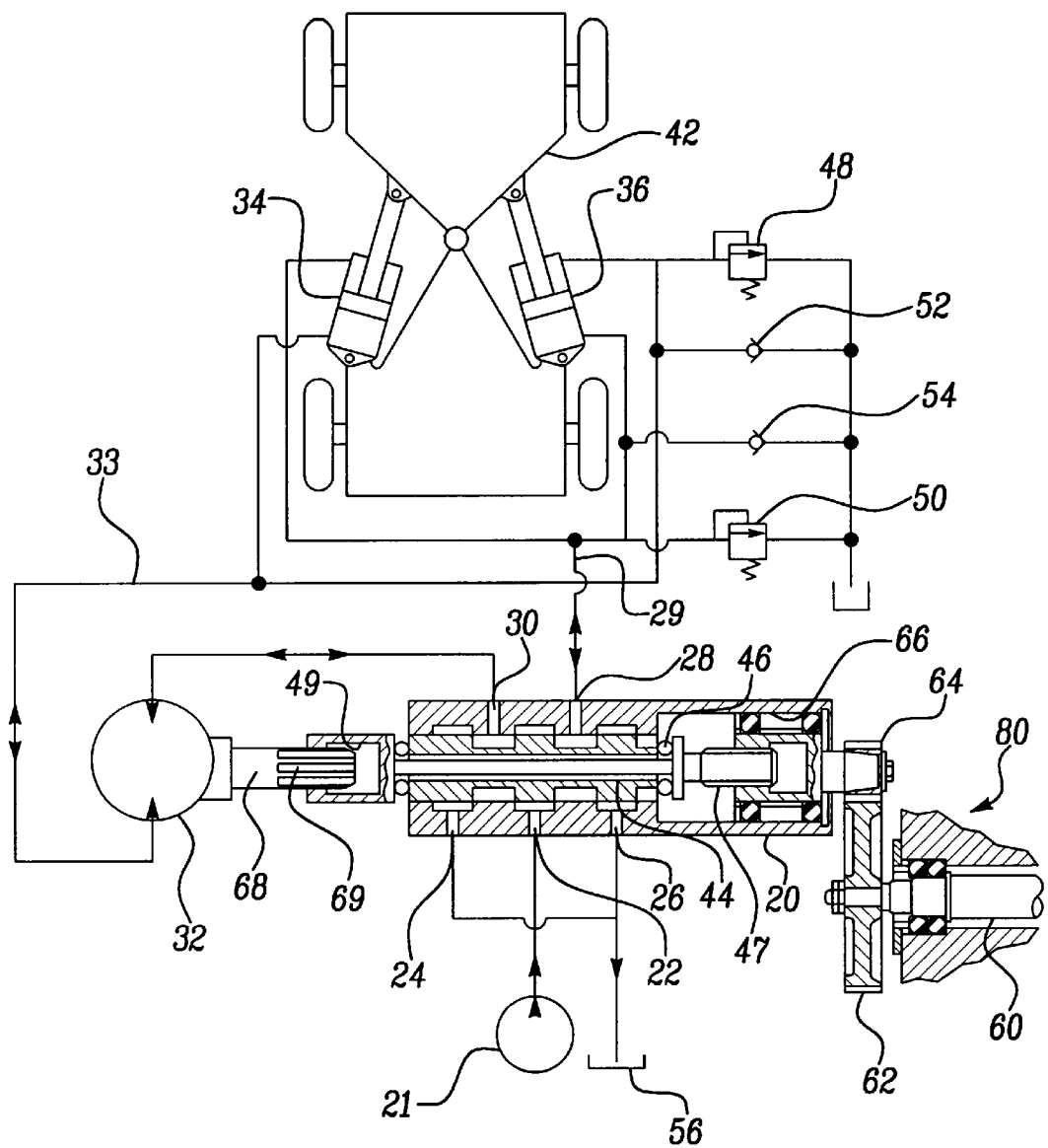
FIG. 3 is a circuit diagram showing the construction of a power steering system for construction equipment in accordance with the preferred embodiment of the present invention.

FIG. 3 is a circuit diagram showing the construction of a power steering system for construction equipment in accordance with the preferred embodiment of the present invention.

In FIG. 3, the reference numeral 20 denotes a directional control valve for controlling pressurized oil for the left and right steering cylinders. The directional control valve 20 includes a pump port 22, through which pressurized oil from an oil pump 21 is introduced into the valve 20. The valve also has first and second drain ports 24 and 26, through which oil from the left and right steering cylinders 34 and 36 is selectively discharged into an oil tank 56. The valve 20 further includes first and second oil ports 28 and 30, thus allowing pressurized oil to be selectively fed from the valve 20 into the left and right steering cylinders 34 and 36 or discharged from the cylinders 34 and 36 into the valve 20 through the two ports 28 and 30. Movably received in the valve 20 is a spool 44, with a bearing 46 being provided at each end of the spool 44.

The first oil port 28 is connected to a first oil line 29, which is branched into two lines. The two branch lines of the first oil line 29 are connected to the small chamber of the left steering cylinder 34 and the large chamber of the right steering cylinder 36. Meanwhile, the second oil port 30 is connected to a reversible motor 32. This motor 32 is connected to a second oil line 33 which is branched into two lines. The two branch lines of the second oil line 33 are connected to the large chamber of the left steering cylinder 34 and the small chamber of the right steering cylinder 36. A relief valve 48, 50 is mounted to a branch line of each of the first and second oil lines 29 and 33. A check valve 52, 54 is mounted to a branch line branched from the outlet of each of the two relief valves 48 and 50.

The operational effect of the steering system of this invention will be described hereinbelow.

In order to steer the front frame 42 of a loader to the left, a steering wheel (not shown), which is coupled to a steering column 60, is rotated by an operator to the left. When the steering wheel is rotated to the left as described above, the steering column 60 rotates its drive gear 62 in the same direction. The drive gear 62 thus rotates a driven gear 64 in an opposite direction. A nut sleeve 66, which is perpendicularly connected to the driven gear 64 and has an integrated nut part, is rotated, thus moving the spool 44 to the left in FIG. 3. The above spool 44, with a nut part 47, is movably received in the sleeve 66 with the nut part 47 of the spool 44 engaging with the nut part of the sleeve 66. Therefore, the spool 44 moves to the left when the sleeve 66 is rotated as described above. In this case, an internal passage is formed in the valve 20 and connects the pump port 22 to the first oil port 28. Therefore, pressurized oil is fed from the valve 20 into both the small chamber of the left steering cylinder 34 and the large chamber of the right steering cylinder 36 through the first oil line 29, thus steering the front frame 42 of the loader to the left.

In the above state, oil is discharged from both the large chamber of the left steering cylinder 34 and the small chamber of the right steering cylinder 36 prior to being introduced into the reversible motor 32. The oil thus rotates the motor 32. The motor 32 has a spline shaft 68, with the spline part 69 of the shaft 66 engaging with an internal spline part 49 of the spool 44. Therefore, the rotating force of the above motor 32 is transmitted to the internal spline part 49 of the spool 44, thus rotating the spline part 49 while quickly moving the spool 44 to the right. When the steering wheel is stopped, the reversible motor 32 stops the spool 44 with pressurized oil being discharged from the motor 32 into the valve 20 prior to being returned to the tank 56 through the first drain port 24.

In order to steer the front frame 42 of the loader to the right, the steering wheel is rotated to the right. When the steering wheel is rotated to the right as described above, the steering column 60 rotates its drive gear 62 in the same direction. The drive gear 62 thus rotates the driven gear 64 and allows the nut sleeve 66 to be rotated. Therefore, the spool 44 moves to the right in FIG. 3. In this case, an internal passage is formed in the valve 20 and connects the pump port 22 to the second oil port 30. Therefore, pressurized oil is fed from the valve 20 through the motor 32 and the second oil line 33 into both the large chamber of the left steering cylinder 34 and the small chamber of the right steering cylinder 36 thus steering the front frame 42 of the loader to the right. The rotating force of the motor 32 is transmitted to the internal spline part 49 of the spool 44, thus rotating the spline part 49 while quickly moving the spool 44 to the left. When the steering wheel is stopped, the reversible motor 32 stops the spool 44 in the same manner as described above.

In this case, oil from both the small chamber of the left steering cylinder 34 and the large chamber of the right steering cylinder 36 passes through the first oil line 29 prior to being introduced into the valve 20 through the first oil port 28. The oil is, thereafter, returned to the tank 56 through the second drain port 26.

In the present invention, the nut part 47 of the spool 44 may be a left-handed or right-handed screw in accordance with the connection between the directional control valve 20 and the chambers of the two steering cylinders 34 and 36. Of course, the nut part 47 of the spool 44 identifies the rotating direction of the steering wheel with that of the loader's front frame 42.

As described above, the present invention provides a power steering system for construction equipment. The steering system has a simple construction and quickly steers construction equipment with a high steering response, and improves the operational precision while controlling the position of the left and right steering cylinders. The simple construction of the steering system effectively reduces the production cost of the system while conserving power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power steering system for construction equipment having a steering wheel, said system comprising:

a first steering cylinder and a second steering cylinder, each of said cylinders having a first chamber and a second chamber;

a pump discharging pressurized fluid for said cylinders;

a directional control valve having a movable spool and a plurality of internal passages for selectively controlling said pressurized fluid from said pump, said directional control valve being in fluid communication with said pump and said cylinders and being positioned therebetween;

a power transmission unit coupled to said directional control valve for linearly moving said spool in response to the steering wheel; and a reversible motor coupled to said directional control valve for linearly moving said spool in response to said pressurized fluid, a fluid path between said directional control valve and said cylinder, said reversible motor being psitioned in the fluid path, wherein the steering system either selectively feeds said pressurized fluid from said pump into said first chamber of said second cylinder and into said second chamber of said first cylinder thereby causing discharged pressurized fluid from said second chamber of said second cylinder and said first chamber of said first cylinder to start said reversible motor when the steering wheel is rotated in a first direction or selectively feeds said pressurized fluid from said pump directly through said reversible motor and into said first chamber of said first cylinder and said second chamber of said second cylinder when the steering wheel is rotated in a second direction.

\* \* \* \* \*